United States Patent [19]

Robinson et al.

[11] 3,807,543

[45] Apr. 30, 1974

[54] RIBBON SPOOL SPINDLE

[75] Inventors: Paul G. Robinson, Locke; Donald G. Anderson, Moravia, both of N.Y.

[73] Assignee: SCM Corporation, New York, N.Y.

[22] Filed: Sept. 27, 1971

[21] Appl. No.: 183,926

[52] U.S. Cl. .................................. 197/151, 242/68.3

[51] Int. Cl. .................................. B41j 33/14

[58] Field of Search ........... 197/151, 152, 153, 154, 197/155, 156, 157, 158, 159, 160, 161, 162, 163, 164, 165; 101/336; 242/68.3

[56] References Cited

UNITED STATES PATENTS

| | | | |
|---|---|---|---|
| 1,104,359 | 7/1914 | Kidder | 197/151 |
| 2,825,450 | 3/1958 | Lambert | 197/151 X |
| 2,859,852 | 11/1958 | Suif | 197/151 X |
| 1,035,197 | 8/1912 | King et al. | 197/153 R |
| 3,359,020 | 12/1967 | O'Donnell | 242/68.3 X |
| 1,151,337 | 8/1915 | Brand | 197/175 X |
| 1,319,429 | 10/1919 | Spiro | 242/68.3 |
| 1,889,657 | 11/1932 | Henry | 197/153 R |
| 2,853,175 | 9/1958 | Regentrop et al. | 197/175 |
| 3,195,708 | 7/1965 | Biedinger | 197/175 |
| 3,195,828 | 7/1965 | Kuckhoff et al. | 197/175 UX |

*Primary Examiner*—Ernest T. Wright, Jr.

*Attorney, Agent, or Firm*—Milton M. Wolson; Kenneth Greb

[57] ABSTRACT

This invention relates to business machines utilizing printing ribbons, and in particular to a spindle of molded unitary construction to retain a reel in an operative position for winding ribbon.

3 Claims, 3 Drawing Figures

PATENTED APR 30 1974

3,807,543

INVENTOR
PAUL G. ROBINSON
DONALD G. ANDERSON
BY

RIBBON SPOOL SPINDLE

BACKGROUND OF THE INVENTION

In business machines utilizing ribbon reels, ribbon is generally fed from a supply reel to a take-up reel. During operation, a condition sometimes occurs whereby one of the reels has a tendency to climb its support spindle and if no means are provided to prevent this condition, the reel climbs the spindle and the ribbon becomes misaligned with its guides resulting in a ribbon feed malfunction rendering the machine inoperative.

Previous efforts to improve the construction and operation of reel mounting mechanisms have resulted in less than optimum characteristics. For instance, many known reel mounting mechanisms employ a combination machined metal spindle cooperating with a spring biased pivotally attached locking member. With this structure, installing a reel was accomplished by first manually orienting the locking member into axial alignment with the spindle, and after placing the reel on the spindle, re-orienting the member out of axial alignment and into locking engagement with the spindle to retain the reel on the spindle.

Other known mechanisms of this kind employ a machined metal spindle located distant from a pivotally mounted semi-circular spring biased retaining means.

To install a reel in this structure, the semi-circular means is manually pivoted outward of the spindle to allow placement of the reel on the spindle, and thereafter pivoted inward toward the spindle until it is situated between the flanges of the reel to retain the reel on the spindle.

These means possess various disadvantages as, for example, much manual manipulation is required to install a reel, a multiplicity of parts is required, and assembly, and servicing costs are excessive.

Accordingly, it is the object of this invention to provide a reel mounting mechanism of unitary molded construction requiring little or no machining operations.

Another object of this invention is to provide a reel mounting mechanism wherein the ribbon reel support and the retention means are integral.

A further object of this invention is to provide a reel mounting mechanism that is easily assembled and disassembled.

A still further object of this invention is to provide a reel mounting mechanism wherein the reel support means is automatically retained within the typewriter without special tools and fasteners.

A still further object of this invention is to provide a reel mounting mechanism of less parts and consequently less cost.

A still further object of this invention is to provide a reel mounting mechanism that permits a reel to be snapped into position on a support means and to retain the reel in position under all load conditions thereby preventing ribbon misalignment.

A still further object of this invention is to provide a integral reel mounting mechanism that is easily installed and serviced.

Other objects and a fuller understanding of the invention may be had by referring to the following description and claims, taken in conjunction with the accompanying drawing in which:

Figures 1, 2, 3:
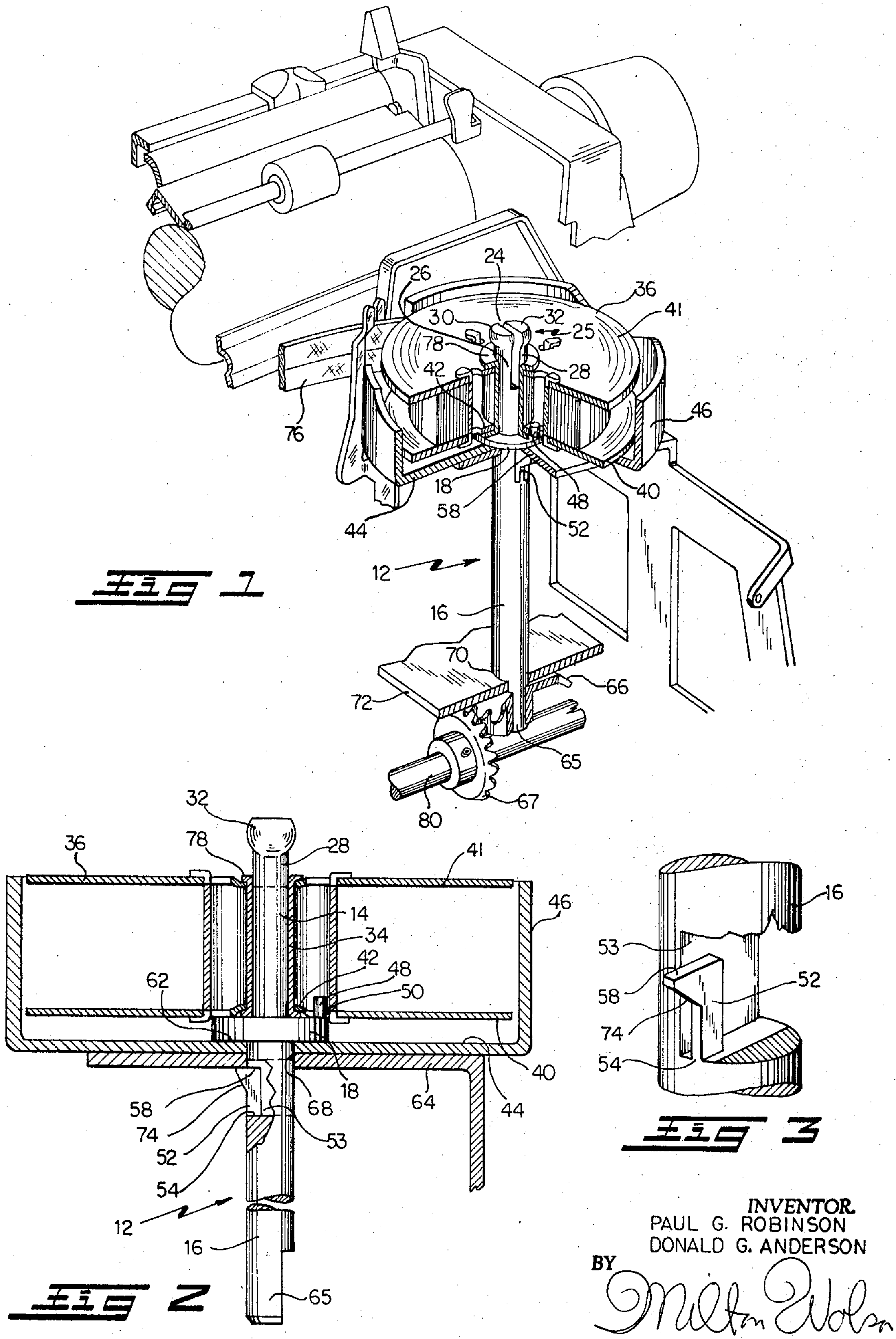
FIG. 1 is a perspective view of a portion of a typewriter showing the general relationship of the reel mounting mechanism to the typewriter mechanism.
FIG. 2 is an elevational view showing the reel mounting mechanism and related mechanisms in section view.
FIG. 3 is a partial perspective view showing the latching member relative to the spindle opening.

Referring now to the drawing showing the reel mounting mechanism comprised of an integral molded plastic spindle 12 adapted for installation in a typewriter.

Spindle 12 includes an upper extension 14, a lower extension 16 and an integral flat deck portion 18. Upper extension 14 extends centerwise upward of deck 18 and terminates in a bifurcated end 25, the bifurcated end 25 defining a bifurcation 24, the bifurcation extending towards deck 18 a distance sufficient to allow tines 26 and 28 of bifurcated end 25 to converge when a reel 36 is being installed. The tines 26, 28 see FIG. 1 are capped by a pair of integral ball shaped segments 30 and 32, the outermost periphery of the segments 30, 32 in their normal relaxed state being greater than a receptive opening 34 in a reel 36. The base periphery of the segments 30, 32 join the shaft portion of extension 14 at its periphery, wherein the uniform diameter of the shaft is sufficient to rotatably receive the opening 34 of reel 36 and wherein the distance between the base of segments 30 and 32 and the junction of extension 14 with deck 18 is greater than the width of reel 36.

In the illustrated embodiment, the deck 18 is disk shaped and positioned in a plane perpendicular to the axis of spindle 12 and of minimal thickness so that reel 36 is centrally supported on deck 18 with the outer periphery of lower flange 40 removed from contact with the base 44 of reel cup 46. Projecting upward from deck 18 and parallel to extension 14 is integral pin 48 with a diameter less than the receptive opening 50 in hub base 42 of reel 36. Pin 48 projects from deck 18 a distance sufficient to engage and drive reel 36 when the reel 36 is placed on spindle 12 wherein receptive opening 50 and pin 48 are in alignment.

Lower extension 16 of spindle 12 extends centerwise from deck 18 and includes at its upper end, (FIG. 2) yieldable latch member 52, the structure of which is substantially within the peripheral confines of extension 16. Member 52 is integral with extension 16 being supported in an opening 53 in extension 16 at its base 54. A shelf portion 58 is located at the top of latch member 52.

Opening 53 of spindle 12 has a width greater than the width of member 52 to allow deflection of member 52 into opening 53. It is preferred, in the embodiment depicted that opening 53 and bifurcation 24 are in alignment. Shelf 58 extends beyond opening 53 when in its normal relaxed state and is perpendicular to the axis of spindle 12 and situated a distance from surface 62 of deck 18, this distance being greater than the combined thickness of support frame 64 and reel cup base 44.

Lower end 65 of extension 16 is in the shape of a "D", the length of the "D" portion extending a distance sufficient to accomodate cooperating gear 66 (FIG. 1).

Spindle 12 is installed in a typewriter by orienting the spindle 12 in alignment with opening 69 of combination frame 64 and reel cup 46 and inserting the "D"

shaped end 65 of the spindle 12 into opening 68 and progressively inserting the spindle 12 into the opening 70 of lower frame 72. At this time a gear 66 having a D-shaped bore, is positioned in mesh with cooperating gear 67 and in alignment with frame opening 70. End 65 of spindle 12 is then aligned and inserted into the gear 66. Retention of gear 66 on spindle 12 is accomplished by the gear 66 slideably abutting cross shaft 80.

Simultaneously member 52, abuts the edges of opening 68 at its camming surface 74 thereby deflecting member 52 into opening 53 in spindle 12.

After member 52 passes through the opening 68, it returns to its relaxed state underlying the flat under surface of frame 64 at which time, deck 18 is seated on cup base 44. Consequently spindle 12 is constrained in operating position by the cooperating relationship of member 52, and deck 18 with the combination frame 64 and cup base 44.

Reel 36 is installed for operation by aligning reel opening 34 with the bifurcated spindle end 25 and placing the reel 36 on the spindle 12 whereupon segments 30 and 32 are urged to converge thereby reducing the outermost periphery of the segments 30, 32. The converged segments 30, 32 permit reel 36 to be progressively lowered while simultaneously aligning opening 50 with pin 48. After upper reel flange 41 slides on and below converged ball segments 30 and 32, the segments 30, 32 diverge to their normal relaxed state.

In operation, when ribbon 76 is being fed for printing, any tendency of the reel 36 to climb spindle 12 will be prevented when upper hub flange 78 abuts the base periphery of segments 30 and 32. The segments 30 and 32, being in their normal relaxed state and having an outer peripheral diameter greater than opening 34, will prevent any further climbing of the reel 36 and ribbon misalignment.

Although the invention has been described in its preferred form with a certain degree of particularity, it is understood that the present disclosure of the preferred form has been made only by way of example and that numerous changes in the details of construction may be resorted to without departing from the spirit and the scope of the invention as hereinafter claimed.

We claim:

1. A reel spindle assembly for typewriters for supporting a ribbon reel comprising:

a frame having a receiving opening;

a spindle for inserting in said frame receiving opening;

said spindle having an integral bifurcated upper end, said bifurcated upper end having tines terminating in ball-shaped segments, said tines converging by said ribbon reel during installation of said ribbon reel and diverging to a relaxed state after installation of said ribbon reel;

said spindle having an integral flat deck portion circumventing the periphery of said spindle and spaced from said bifurcated upper end for supporting said ribbon reel between said deck portion and said bifurcated upper end;

said spindle having an opening therein spaced below said deck portion; and said spindle having an integral yieldable latch member spaced below said deck portion and in alignment with said spindle opening, said latch member having a shelf portion projecting from said spindle opening, said latch member yielding within said spindle opening when said latch member passes through said frame receiving opening and restoring to a relaxed state after said latch member advances beyond said frame receiving opening for rotatably securing said spindle to said frame by said frame being positioned between said deck portion and said shelf portion of said latch member.

2. A reel spindle assembly as defined in claim 1 wherein said latch member includes a cam surface opposite said shelf portion for camming said latch member into said spindle opening.

3. A reel spindle assembly as defined in claim 1 wherein said latch member has a lower end integrally extending from said spindle within said spindle opening and has an upper end free to yield about said integral lower end within said spindle opening.

* * * * *